Patented Oct. 15, 1929

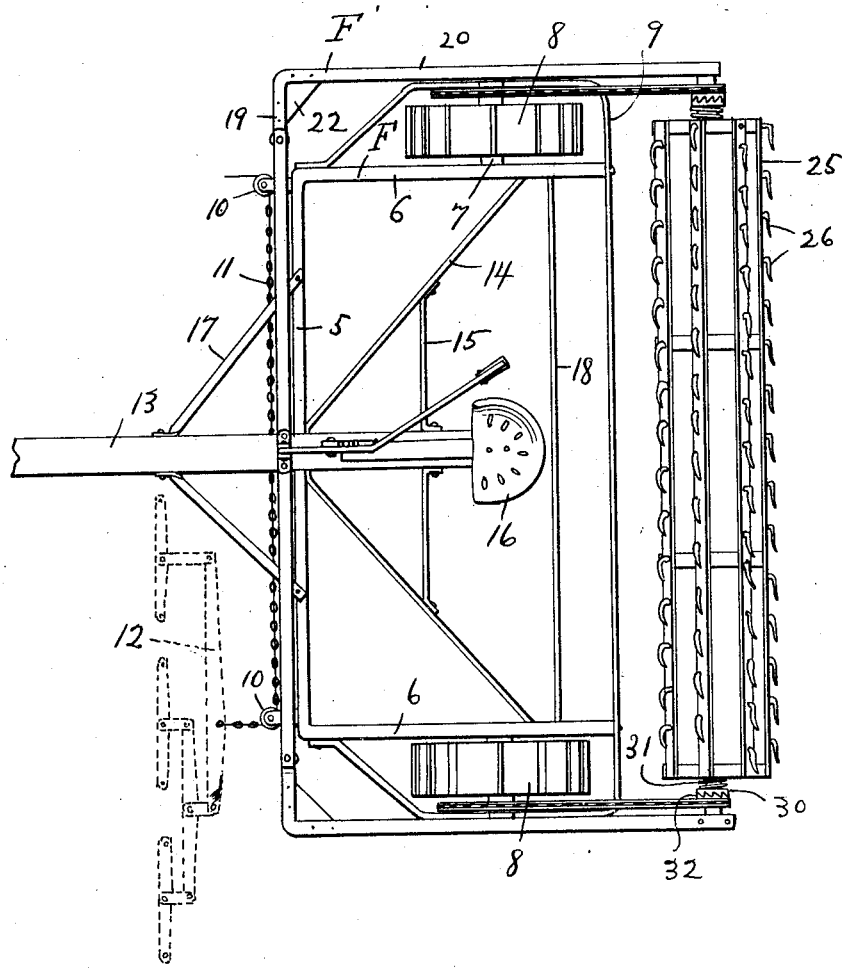

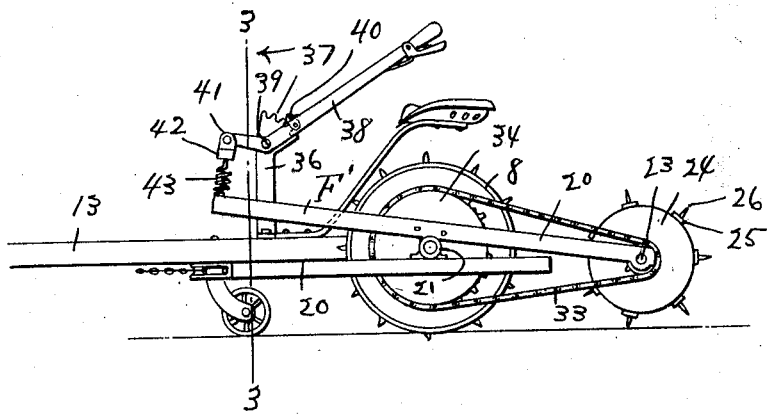
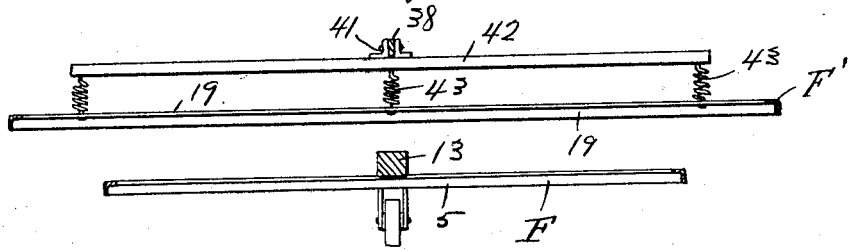
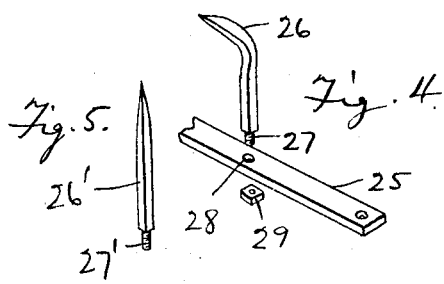

1,731,304

UNITED STATES PATENT OFFICE

WILLIAM A. GORDON, JR., AND SANFORD W. HICKMAN, OF ALMOTA, WASHINGTON

WEEDER

Application filed May 3, 1927. Serial No. 188,501.

The present invention relates to a weeder and has for its principal object to provide an apparatus of this nature which is exceedingly efficient and reliable in use, comparatively inexpensive to manufacture, strong and durable, easy to manipulate, and adjust, and well adapted to the purpose for which it is designed.

Another very important object of the invention lies in the provision of a weeder including a wheeled frame having an auxiliary frame rockably mounted thereon and rotatably supporting a weeder drum and means whereby the auxiliary frame may be rocked to different adjusted positions, and means for driving the drum from the wheels of the main frame.

A still further important object of the invention lies in the provision of a wheeled weeder frame with an auxiliary drum supporting frame rockably mounted thereon, and spring means for urging the drum into engagement with the ground.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the weeder embodying the features of my invention, Figure 2 is a side elevation thereof, Figure 3 is a detail vertical transverse section taken substantially on the line 3—3 of Fig. 2 looking in the direction of the arrow, Figure 4 is a detail perspective view showing one of the teeth disengaged from one of the bars of the drum, Figure 5 is a perspective view of a modified form of the tooth.

Referring to the drawings in detail, it will be seen that the letter F denotes generally the main frame which is of a general U-shaped formation comprising a front intermediate bar 5 and side rearwardly extending bars 6, axles 7 project outwardly from intermediate portions of the side bars 6 and have journalled thereon wheels 8. A brake strap 9 has its ends fixed to the junctures of the bars 5 and 6 and extends outwardly and rearwardly and then rearwardly to the side of the wheels 8 and then across the rear ends of the bars 6. Pulleys 10 are mounted on the intermediate front bar 5 and have trained thereover an equalizing chain 11 through which draft means such as is shown at 12 may be attached. A tongue 13 extends across the center of the bar 5 and is suitably fixed thereto and is braced in respect to the side bar 6 by braces 14 and 15. A driver's seat 16 is mounted on the rear portion of the tongue. The front portion of the tongue is braced in respect to the intermediate front bar 5 of the main frame F by means of braces 17. A cross bar or brace 18 connects the rear portions of the bars 6.

An auxiliary frame is denoted generally by the letter F' and is also of U-shaped formation having a front intermediate portion 19 and side rearwardly extending portions 20. The intermediate portions of the portions 20 are equipped with bearing brackets 21 for receiving the extremities of the axles 7 so as to rockably mount the auxiliary frame in respect to the main frame. Corner braces 22 are provided at the junctures of the portions 19 and 20 of this auxiliary frame. A shaft 23 is journalled in the extremities of the portions 20 and has discs 24 fixed thereto and connected by bars 25 which have curved teeth 26 detachably fixed therein by means of reduced shank 27 piercing openings 28 and held in place by nuts 29. In Fig. 5 a modified straight form of the tooth 26 is shown having a reduced shank 27 to be mounted in similar manner to the curved teeth 26. Ratchet members 30 are splined on the shaft 23 and by means of the spring 31 are normally held in engagement with combined sprocket and ratchet elements 32 rotatably mounted on the shaft 23 and having trained thereover chains 33 which are also trained over sprockets 34 rotatable with wheels 8. Thus it will be seen that the drum thus performed will rotate when the apparatus is moved forwardly and when turning the corners at which time the outside wheel will drive the same.

A bracket 36 rises from the tongue 13 and has a notched segment 37 at the upper end thereof. A lever 38 is pivoted intermediate its ends as at 39 on the bracket 36 and has a detent 40 engageable with the notched segment 37 so that the lever may be held in different adjusted positions. This lever is pivotally connected as at 41 with a transversely extending rod 42 having springs 43 connected thereto and connected to the front portion 19 of the auxiliary frame. Thus it will be seen that the lever 28 may be rocked in one direction to tension springs and urge the drum in engagement with the ground. It will also be seen that the lever 38 may be rocked to relieve the tension on the springs and to be rocked even further so as to rock the auxiliary frame and disengage the weeder drum entirely from the ground.

From the above detailed description it will be seen that we have devised an exceedingly simple structure which will prove thoroughly efficient and reliable in operation and attain the objects specified as desirable in the above description. The present embodiment of the invention has been disclosed merely as by way of example because it will attain these objects but it is to be understood that changes in the details of construction, and in the combination and arrangement of parts may be resorted to without departing from the spirit or scope of the invention as hereinafter claimed or sacrificing any of its advantages.

Having thus described our invention, what we claim as new is:

An apparatus of the class described including, in combination, a main frame of U-shaped formation, axles extending from the sides of the auxiliary frame, wheels journalled on the axles, a U-shaped auxiliary frame, means for pivotally mounting the intermediate portions of the sides of the auxiliary frame with the axles, a drum journalled to the extremities of the auxiliary frame, chain and sprocket drive connections between the wheels and the drum, a plurality of springs connected with the intermediate portion of the auxiliary frame, a rack rising from the main frame, a lever pivoted on the rack, a rod pivotally connected with the lever and attached to the springs.

In testimony whereof we affix our signatures.

WILLIAM A. GORDON, Jr.
SANFORD W. HICKMAN.